(12) United States Patent
Motoki et al.

(10) Patent No.: US 8,373,377 B2
(45) Date of Patent: Feb. 12, 2013

(54) DRIVING CIRCUIT OF STEPPING MOTOR

(75) Inventors: Yoshito Motoki, Isesaki (JP); Tsutomu Shimazaki, Ota (JP); Yuanjie Wu, Beijing (CN)

(73) Assignee: Sanyo Semiconductor Co., Ltd., Gunma (JP)

( * ) Notice: Subject to any disclaimer, the term of this patent is extended or adjusted under 35 U.S.C. 154(b) by 69 days.

(21) Appl. No.: 12/928,745

(22) Filed: Dec. 17, 2010

(65) Prior Publication Data

US 2011/0148340 A1    Jun. 23, 2011

(30) Foreign Application Priority Data

Dec. 18, 2009  (CN) .......................... 2009 1 0261617
Jan. 8, 2010   (JP) ..................................... 2010-3021

(51) Int. Cl.
*H02P 8/10*     (2006.01)
(52) U.S. Cl. ........ 318/696; 318/691; 318/692; 318/693; 318/694; 318/695
(58) Field of Classification Search .................. 318/696, 318/691–695
See application file for complete search history.

(56) References Cited

U.S. PATENT DOCUMENTS 6,838,853 B2 *  1/2005  Matsunaga et al. ........... 318/685
7,023,157 B2 *  4/2006  Fukamizu et al. ............ 318/368
7,352,150 B2 *  4/2008  Fujinaka et al. .............. 318/685

* cited by examiner

*Primary Examiner* — Walter Benson
*Assistant Examiner* — David Luo
(74) *Attorney, Agent, or Firm* — Osha Liang LLP

(57) ABSTRACT

A shift register which receives a transmission clock signal, which is shifted according to the transmission clock signal, and which outputs a gate signal a predetermined time after reset; a reset circuit which outputs a reset signal for resetting the shift register when the reset circuit receives an input of a step signal for driving the stepping motor; and a switching element which receives the gate signal of the shift register and which is switched between a blocked state and a conductive state are provided in a driving circuit of a stepping motor.

2 Claims, 5 Drawing Sheets

DRIVING CIRCUIT OF STEPPING MOTOR

CROSS-REFERENCE TO RELATED APPLICATIONS

The entire disclosure of Chinese Patent Application No. 200910261617.8 filed on Dec. 18, 2009, and the entire disclosure of Japanese Patent Application No. 2010-3021 filed on Jan. 8, 2010, including specification, claims, drawings, and abstract, are incorporated herein by reference in their entirety.

BACKGROUND

1. Technical Field

The present invention relates to a driving circuit of a stepping motor.

2. Background Art

In order to rotationally drive a stepping motor, a rotational torque must be applied. In particular, during an initial stage of rotation, a high rotational torque must be applied, but during a rotation retaining state where the stepping motor is continuously rotated, the rotational torque may be reduced. Therefore, there is an advantage that power consumption can be reduced by executing a control to reduce the applied current to the stepping motor during the rotation retaining state. In order to switch the applied current, it is necessary to switch a current-setting reference voltage of the driving circuit of the stepping motor.

FIG. 5 shows a structure of a driving circuit of a stepping motor of the related art. During the initial stage of rotation, a switch S1 is switched OFF to set a high voltage for the current-setting reference voltage VREF, and, during the rotation retaining state, the switch S1 is switched ON by a switch control signal X from the outside, to connect resistors R2 and R3 in parallel to each other and to consequently set a lower voltage value for the current-setting reference voltage VREF.

In the driving circuit of a stepping motor of the related art, a switch control signal X to the switch S1 must be generated by an external device (an electric device with the stepping motor equipped thereon) and applied to the switch S1. Because of this, the circuit structure of the external device (electronic device) becomes complicated, and there have been disadvantages for the manufacturers of the external device (electronic device), such as an increase in manufacturing cost.

In addition, there has been a disadvantage in that the ports (terminals) of the driving circuit of the stepping motor are occupied in order to input the switch control signal X to the switch S1.

SUMMARY

According to one aspect of the present invention, there is provided a driving circuit of a stepping motor, comprising a shift register which receives a reference transmission signal, which is shifted according to an input of the reference transmission signal, and which outputs a gate signal a predetermined time after reset; a reset circuit which outputs a reset signal for resetting the shift register when the reset circuit receives an input of a step signal for driving the stepping motor; and a switching element which receives the gate signal of the shift register and which is switched between a blocked state and a conductive state.

BRIEF DESCRIPTION OF THE DRAWINGS

A preferred embodiment of the present invention will be described in detail by reference to the following drawings, wherein.

DESCRIPTION OF EMBODIMENTS

Figure 1:
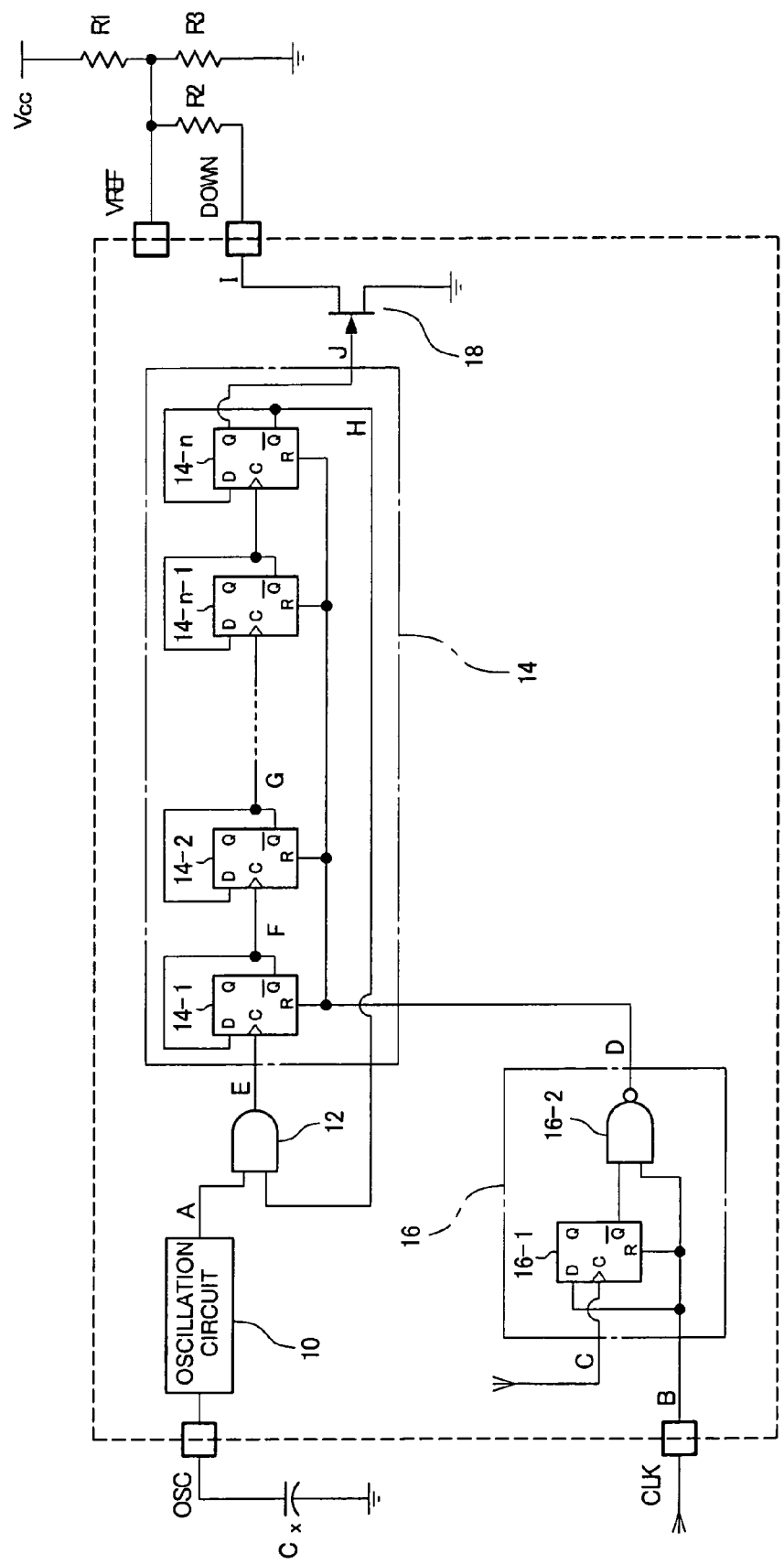
FIG. 1 is a diagram showing the structure of a driving circuit of a stepping motor according to a preferred embodiment of the present invention.

As shown in FIG. 1, a driving circuit of a stepping motor 100 according to a preferred embodiment of the present invention comprises an oscillation circuit 10, an AND element 12, a shift register 14, a reset circuit 16, and a switching element 18. The driving circuit 100 is preferably formed on one semiconductor chip along with a basic driving circuit of the stepping motor.

The oscillation circuit 10 oscillates at a frequency according to a capacitance of a capacitor Cx connected to an external terminal OSC, and outputs an oscillation clock signal A. The oscillation clock signal A is input to the AND element 12.

The AND element 12 receives the oscillation clock signal A and an inverted output Q-bar of a flip-flop 14-$n$ at the final stage of the shift register 14, and outputs an internal counter clock signal E which assumes a high level when both inputs are at the high level and assumes a low level when one or both of the inputs is at the low level. The internal counter clock signal E is input to a clock terminal C of a flip-flop 14-1 at the first stage of the shift register 14.

The shift register 14 has a structure in which n stages of flip-flops 14-1~14-$n$ are connected in series. The flip-flops 14-1~14-$n$ may be D-flip-flops. In the shift register 14, every time the internal counter clock signal E which is input to the clock terminal C of the flip-flop 14-1 of the first stage assumes the high level, the non-inverted output Q is set to the high level and the inverted output Q-bar is set to the low level, and, in synchronization with the internal counter clock signal E, this change of the signal is transmitted to the flip-flop 14-$n$ of the final stage. In other words, the internal counter clock signal E which is the reference transmission signal is received, the signal is shifted according to the input of the internal counter clock signal E, and the non-inverted output Q of the flip-flop 14-$n$ is set to the high level a predetermined time after the reset. The output at the non-inverted output Q of the flip-flop 14-$n$ is input to the control terminal of the switching element 18 as a gate signal J.

When the gate signal J which is the output at the non-inverted output Q of the flip-flop 14-$n$ assumes the high level, the inverted output Q-bar assumes the low level. Because the signal at the inverted output Q-bar is input to the AND element 12 as a feedback signal H, the input of the oscillation clock signal A to the shift register 14 is stopped until the shift register 14 is reset, and the shift register 14 maintains this state.

When reset terminals R of the flip-flops 14-1~14-$n$ of every state are set to the low level, the non-inverted outputs Q of all flip-flops 14-1~14-$n$ are reset to the low level and the inverted outputs Q-bar are reset to the high level.

The reset circuit 16 generates a reset signal for resetting the flip-flops 14-1~14-n included in the shift register 14. The reset circuit 16 comprises a flip-flop 16-1 and a NAND element 16-2. The flip-flop 16-1 may be a D-flip-flop. The flip-flop 16-1 receives an internal base clock signal C of the driving circuit 100, and, when a step signal B for controlling the rotational speed (step speed) of the stepping motor is changed from the low level to the high level at the timing when the base clock signal C is changed from the high level to the low level, the inverted output Q-bar is changed from the high level to the low level. The NAND element 16-2 receives the inverted output Q-bar and the step signal B, and generates and outputs a reset signal D which assumes the low level only when both inputs are at the high level. In other words, the reset circuit 16 generates and outputs the reset signal D which assumes the low level only during a period from a timing when the base clock signal C first changes from the high level to the low level after the step signal B changes from the low level to the high level to the timing of next change of the base clock signal C from the low level to the high level.

The reset signal D is input to the reset terminals R of the flop-flops 14-1~14-n of the shift register 14. With this configuration, the shift register 14 is reset every time the step signal B changes from the low level to the high level.

The switching element 18 is set to the blocked (non-conductive) state when the gate signal J from the shift register 14 is at the low level. In this state, the current-setting reference voltage VREF has a value in which the voltage Vcc is divided with the resistors R1 and R3. On the other hand, the switching element 18 is set to the conductive state when the gate signal J from the shift register 14 is at the high level. In this state, the current-setting reference voltage VREF has a value in which the voltage Vcc is divided by a parallel connection of the resistors R1, R2, and R3.

<Rotational Drive State (High Rotational Torque)>

Figure 2:
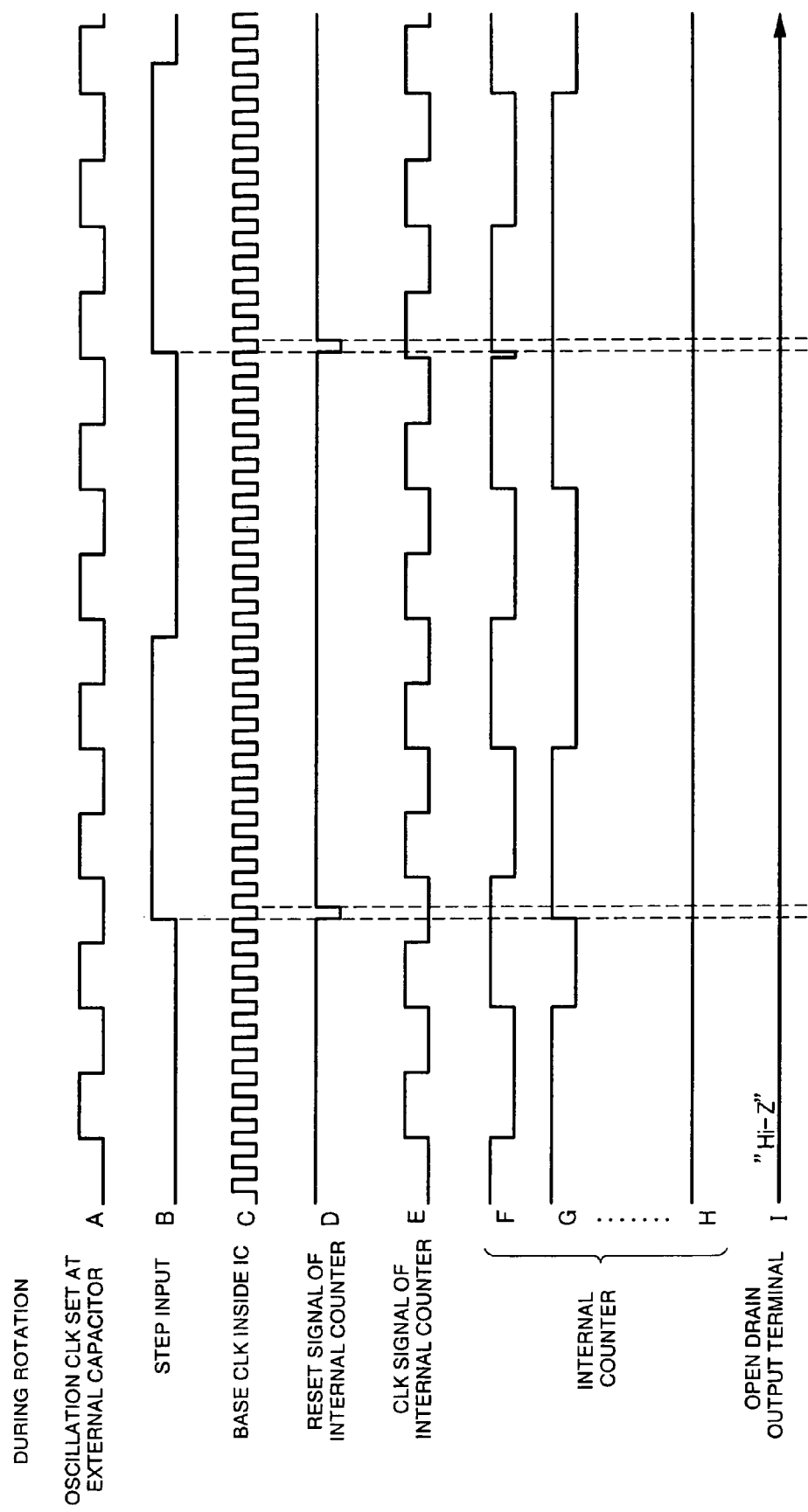
FIG. 2 is a timing chart for explaining a control, in a rotational drive state, of a driving circuit of a stepping motor according to a preferred embodiment of the present invention.

FIG. 2 shows a timing chart of control, in a rotational drive state, of the stepping motor using the driving circuit of the stepping motor 100 of the present embodiment. The rotational drive state refers to a state where the step signal B is applied to the stepping motor and the rotational torque is applied to the stepping motor, so that the stepping motor is rotated.

In this case, as shown in FIG. 2, before the shift register 14 transmits the signal to the final stage, the step signal B is input (change from the low level to the high level), the reset signal D is set to the low level by the input of the step signal B, and the shift register 14 is reset. Therefore, the gate signal J which is output from the shift register 14 is maintained at the low level, and the open drain of the switching element 18 maintains a high impedance.

<Transition from Rotational Drive State (High Rotational Torque) to Rotation Retaining State (Low Rotational Torque)>

Figure 3:
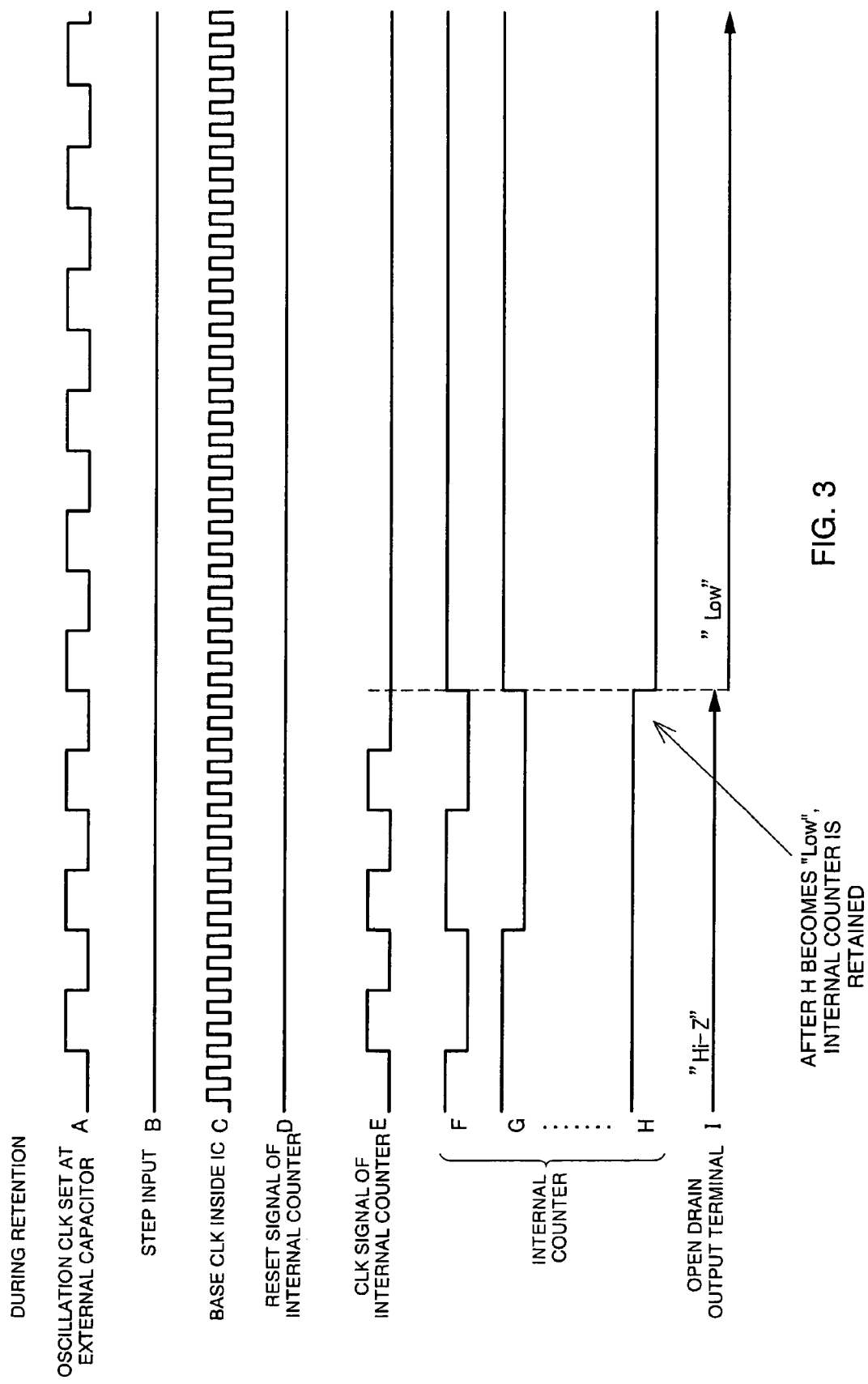
FIG. 3 is a timing chart for explaining a control, during a transition from the rotational drive state to a rotation retaining state, of a driving circuit of a stepping motor according to a preferred embodiment of the present invention.

FIG. 3 shows a timing chart of control, during transition from the rotational drive state (high rotational torque) to a rotation retaining state (low rotational torque), of the stepping motor using the driving circuit of stepping motor 100 according to the present embodiment. Here, the rotation retaining state refers to a state where the step signal B is not applied to the stepping motor and the stepping motor is rotated with a low rotational torque.

When the state transitions from the rotational drive state as shown in FIG. 2 to the rotation retaining state in which the step signal B is not input, as shown in FIG. 3, the reset signal D is maintained at the high level, and, in the shift register 14, the feedback signal H is changed from the high level to the low level after a predetermined time has elapsed, the predetermined time being determined by the period of the oscillation clock signal A and the number of stages of the shift register 14. At the same time, the gate signal J changes from the low level to the high level. With this process, the switching element 18 is set to the conductive state (low impedance), and the current-setting reference voltage VREF is set to a lower voltage than in the rotational drive state.

<Transition from Rotation Retaining State (Low Rotational Torque) to Rotational Drive State (High Rotational Torque)>

Figure 4:
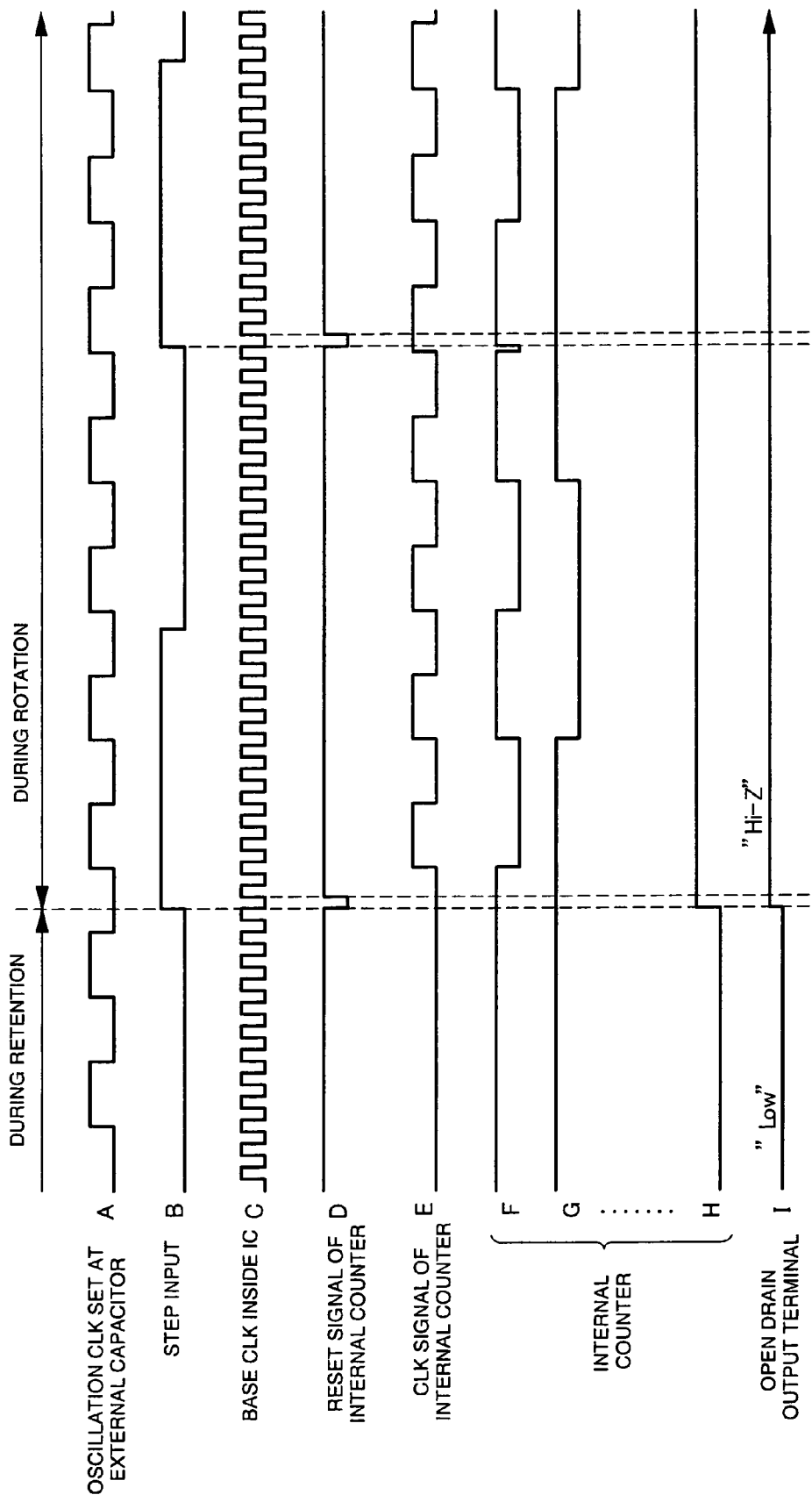
FIG. 4 is a timing chart for explaining a control, during a transition from a rotation retaining state to a rotational drive state, of a driving circuit of a stepping motor according to a preferred embodiment of the present invention.
Figure 5:
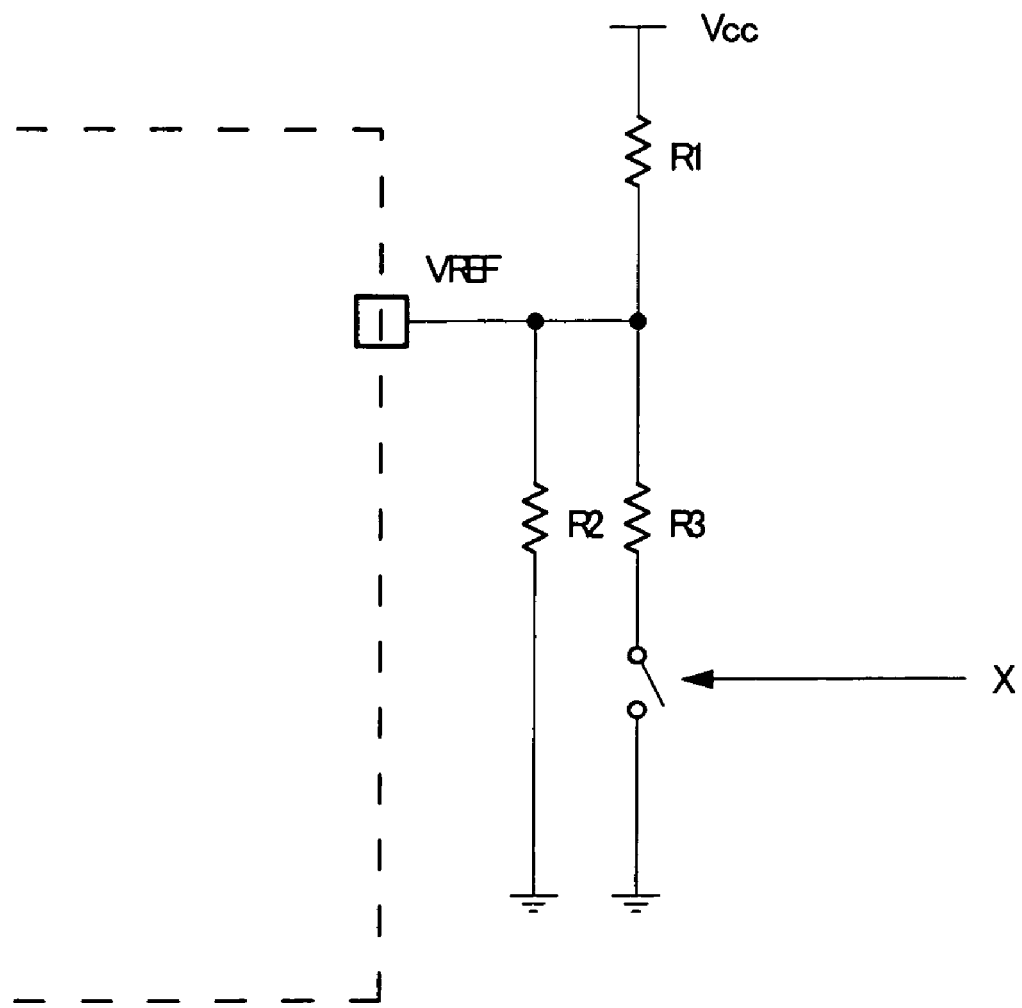
FIG. 5 is a diagram showing a structure of a driving circuit of a stepping motor of the related art.

FIG. 4 shows a timing chart of a control, during transition from the rotation retaining state (low rotational torque) to the rotational drive state (high rotational torque), of the stepping motor using the driving circuit of the stepping motor 100 according to the present embodiment.

When the state transitions from the rotation retaining state as shown in FIG. 3 to the rotational drive state in which the step signal B is input, as shown in FIG. 4, a reset signal D which is changed from the high level to the low level is output and the shift register 14 is reset. With this process, the gate signal J which is output from the shift register 14 changes from the high level to the low level, the open drain of the switching element 18 is set to the high impedance, and the current-setting reference voltage VREF is switched to a higher voltage value than in the rotation retaining state.

As described, according to the driving circuit of stepping motor 100 of the present embodiment, it becomes no longer necessary to generate the switch control signal for switching the current-setting reference voltage VREF by the external device (electronic device equipped with the stepping motor). Therefore, the circuit structure of the external device (electronic device) can be simplified and the burden imposed on the manufacturers of the external device (electronic device) can be reduced.

In addition, it becomes no longer necessary to provide an external terminal for inputting the switch control signal in the driving circuit of the stepping motor.

What is claimed is:

1. A driving circuit of a stepping motor, comprising: a shift register which receives a reference transmission signal, which is shifted according to an input of the reference transmission signal, and which outputs a gate signal a predetermined time after reset; an oscillation circuit oscillates at a frequency according to a capacitance of a capacitor and outputs an oscillation clock signal coupled to the shift register; a reset circuit which outputs a reset signal for resetting the shift register when the reset circuit receives an input of a step signal of two levels for driving the stepping motor and in response to switching of a state of the step signal; and a switching element which receives the gate signal of the shift register and which is switched between a blocked state and a conductive state.

2. The driving circuit of stepping motor according to claim 1, wherein
the switching element is connected to a circuit which switches a drive voltage of the stepping motor.

* * * * *